United States Patent Office.

CONSTANTINE HINGHER, OF NEW BRUNSWICK, NEW JERSEY.

Letters Patent No. 106,819, dated August 30, 1870.

IMPROVEMENT IN COVERING METAL ARTICLES WITH INDIA RUBBER.

The Schedule referred to in these Letters Patent and making part of the same.

*To all whom it may concern:*

Be it known that I, CONSTANTINE HINGHER, of New Brunswick, in the county of Middlesex and State of New Jersey, have invented new and useful Improvements in Covering Metal Articles with India Rubber; and I do hereby declare that the following is a full, clear, and exact description thereof, which will enable others skilled in the art to make and use the same.

This invention relates to improvements in covering metal articles with India rubber, designed mainly for covering hames, and is intended to overcome the difficulties arising from the action of the air confined in the clefts and cavities in the surface of the iron; also from the gases generated by the scale on the surface.

At the present time metal hames and other large metal pieces for use in harness and for other uses are covered by India rubber, by placing thereon thin coverings of the India rubber in the state ready for vulcanizing, and vulcanizing it thereon, forming a coating of hard rubber; but it is found that so much air and moisture are contained in the clefts of the iron which is taken in the rough state, and is generally considerably corroded, which also causes the generation of gases in vulcanizing, the combined action of which, in being expelled from the surface of the iron, throws up so many blisters and makes so many blotches and other rough and unsightly spots, the object of covering the iron, viz: to make a hard smooth surface capable of receiving a high polish, is defeated.

I, therefore, propose to first cover the iron with a thin coating of what is known as rubber cement, to expel the air, moisture, and gases; also to more permanently unite the rubber covering, which I then put on and vulcanize in the ordinary way.

The said India-rubber cement is made of India rubber dissolved in turpentine, benzine, chloroform, alcohol, or other suitable solvent, and is applied at a low heat, say 100° to 150°, not enough to vulcanize the cement, which is preferably provided with the due proportion of sulphur for cementing, but may be applied without it.

This cement and the heat to which it and the iron are subjected has the same effect in expelling the air, gases, &c., from the iron that the present mode of covering the iron does, and, therefore, when the outer covering of India rubber is applied, it is not exposed to such action, but forms smooth and even throughout. It also becomes more thoroughly attached to the iron by the action of the cement, which unites with the iron better than the ordinary coating does, which latter unites firmly with the cement.

Having thus described my invention,

I claim as new and desire to secure by Letters Patent—

The herein-described improvement in the process of coating metal articles with vulcanized India rubber, consisting in the application of the coating of India-rubber cement, and subjecting it to the action of heat before applying the covering of rubber, all substantially as specified.

CONSTANTINE HINGHER.

Witnesses:
GEO. W. MABEE,
T. B. MOSHER.